United States Patent [19]
Mayumi et al.

[11] Patent Number: 4,590,414
[45] Date of Patent: May 20, 1986

[54] BATTERY VOLTAGE REGULATION SYSTEM

[75] Inventors: Nobuo Mayumi, Oobu; Hidetoshi Kato, Suzuka; Hajime Matsuhashi, Kariya, all of Japan

[73] Assignee: Nippondenso Co., Ltd., Kariya, Japan

[21] Appl. No.: 680,959

[22] Filed: Dec. 12, 1984

[30] Foreign Application Priority Data

Dec. 20, 1983 [JP] Japan .................. 58-240473

[51] Int. Cl.$^4$ ............................... H02J 7/00
[52] U.S. Cl. ...................... 320/64; 320/39; 323/316
[58] Field of Search ............ 320/39, 61, 64; 323/316

[56] References Cited

U.S. PATENT DOCUMENTS 4,346,338 8/1982 Nakamoto et al. .................. 320/64
4,386,310 5/1983 Sievers .................. 320/64

FOREIGN PATENT DOCUMENTS 55-18839 2/1980 Japan .
60-35925 2/1985 Japan .

*Primary Examiner*—Patrick R. Salce
*Assistant Examiner*—Anita M. Ault
*Attorney, Agent, or Firm*—Cushman, Darby & Cushman

[57] ABSTRACT

A battery voltage regulating system for an automotive vehicle, wherein a field current flowing through a field coil of an alternator is periodically cut off irrespectively of whether a battery voltage is higher or lower than a reference voltage, and a conduction ratio of the field current is controlled in accordance with a difference between the battery voltage and the reference voltage. The reference voltage is changed in response to an increase or decrease of the conduction ratio, so that a battery voltage is prevented from decreasing when the conduction ratio is increased.

6 Claims, 5 Drawing Figures

BATTERY VOLTAGE REGULATION SYSTEM

BACKGROUND OF INVENTION

1. Field of Invention

The present invention relates to a battery voltage regulating system for controlling an output voltage of an alternating current generator driven by an internal combustion engine and/or a charging voltage for a battery mounted on a motor vehicle.

2. Brief Description of Prior Arts

Various types of battery voltage regulating systems are known in the art, wherein either a battery voltage or an alternator output voltage is sensed and a field current flowing through a field coil of an alternator is cut off when the sensed voltage exceeds a predetermined value, to thereby maintain the battery voltage at a constant desired value.

In a conventional battery voltage regulating system, for example, disclosed in U.S. Pat. No. 4,346,338, when a feedback voltage (an output voltage of an alternator) exceeds a reference voltage, a field current is immediately cut off while when the feedback voltage becomes lower than the reference voltage, the field current is immediately supplied to a field coil. In such a conventional system, an ON-OFF frequency of the field current largely changes depending on a rotational speed of the alternator, an amount of load current and so on, with a result that the battery voltage may overshoot a desired value to a large extent.

In another conventional battery voltage regulating system disclosed in Japanese Unexamined Patent Publication No. 55-18839, a switching element for controlling a field current is forcibly made on and off irrespectively whether a feedback voltage is higher or lower than a reference voltage, and an ON-OFF frequency of the switching element is instead controlled depending on a difference value between the feedback voltage and the reference voltage, so that the battery voltage is effectively prevented from overshooting a desired voltage.

It has, however, still a disadvantage in that the battery voltage is changed in response to a change of the ON-OFF frequency of the switching element, since when it is required to increase or decrease the ON-OFF frequency, the difference value between the feedback voltage and the reference voltage should become correspondingly smaller or larger, which means that the battery voltage should be changed in order to change the ON-OFF frequency.

SUMMARY OF INVENTION

It is, therefore, an object of the present invention to overcome the drawbacks of the above-described conventional systems and to provide an improved battery voltage regulating system, according to which a power transistor is periodically made ON and OFF irrespectively of a battery voltage but a conduction ratio of the power transistor is controlled in response to a difference voltage between the battery voltage and a reference voltage, wherein the reference voltage is changed to become higher or lower in accordance with an increase or decrease of the conduction ratio of the power transistor.

The present invention provides a battery voltage regulating system for an automotive vehicle having a battery, an alternator driven by an internal combustion engine mounted on said vehicle and generating an alternating current, and a full-wave rectifier for rectifying said alternating current to charge said battery, comprising:

an operational amplifier connected to said battery for comparing a battery voltage with a reference voltage and for producing an output voltage which varies in response to a difference between said battery voltage and said reference voltage;

a generating circuit for generating a saw-tooth wave signal voltage;

a comparing circuit connected to said operational amplifier and said generating circuit for comparing said saw-tooth wave signal voltage with said output voltage;

a switching circuit having a power transistor connected to a field coil of said alternator and connected to said comparing circuit for controlling a current flow of a field current flowing through said field coil in accordance with a comparison between said saw-tooth wave signal voltage and said output voltage; and a reference voltage changing circuit for detecting a conduction ratio of said power transistor and changing said reference voltage in response to the detected conduction ratio so as to prevent the battery voltage from decreasing when the conduction ratio increases.

DETAILED DESCRIPTION OF PREFERRED EMBODIMENT

The present invention will be explained hereinafter with reference to the attached drawings.

Figure 1:
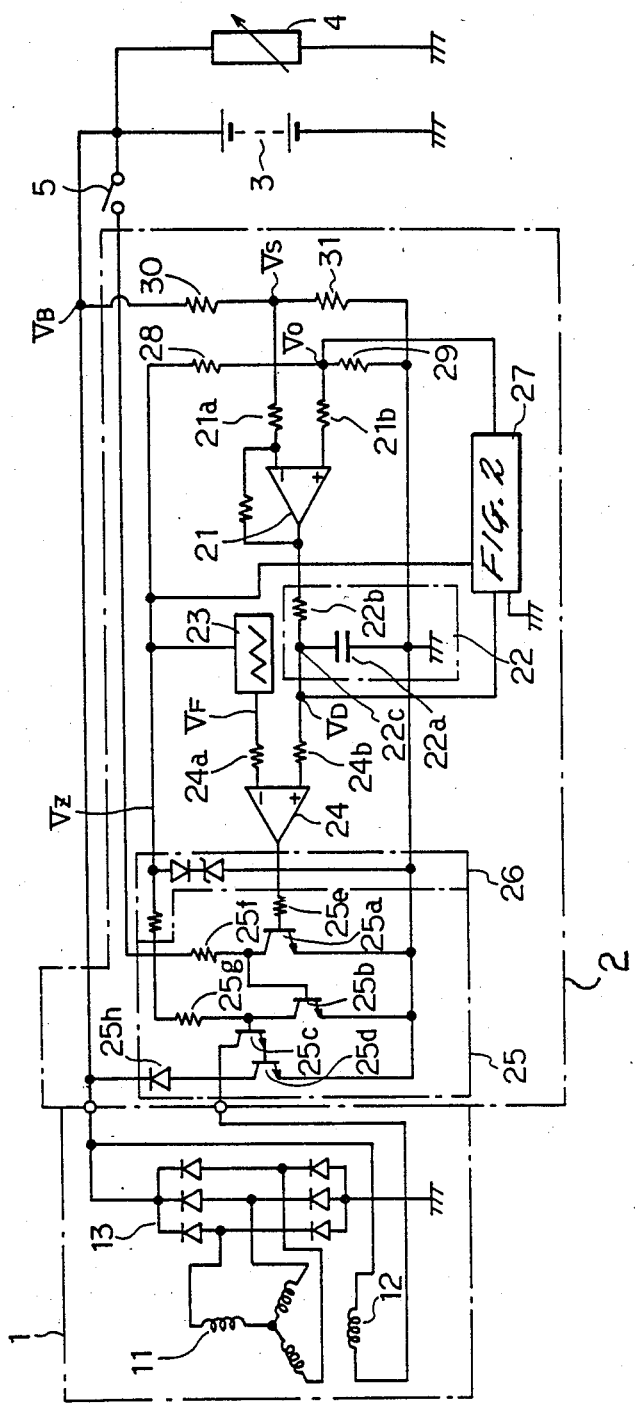
FIG. 1 is an electric wiring diagram of a battery voltage regulating system according to an embodiment of the present invention.

In FIG. 1, numeral 1 designates an alternating current generator (hereinafter referred to as an alternator) driven by an internal combustion engine, including three-phase armature coils 11 for generating alternating current, a field coil 12 and a full-wave rectifier 13 for rectifying the alternating current.

Numeral 2 designates a voltage regulating system (hereinafter referred to as a voltage regulator), usually attached to or mounted within a housing of the alternator, numeral 3 designates a battery mounted on a motor vehicle (not shown), numeral 4 is an electrical load such as head lamps and so on, and numeral 5 is an ignition key switch.

The voltage regulator 2 includes an operational amplifier 21 for comparing a battery feedback voltage $V_S$ representing a divided battery voltage divided by resistors 30 and 31 with a reference voltage $V_O$ and for producing a voltage signal reflecting the comparison (difference) between the voltages $V_S$ and $V_O$. Numeral 22 designates a smoothing circuit having a capacitor 22a and a resistor 22b connected in series with an output terminal of the operational amplifier 21, the circuit 22 acting as a conduction ratio(ON-OFF frequency) detecting circuit.

Numeral 23 designates a signal generating circuit for generating a saw-tooth wave signal $V_F$, which is applied to an inverting input terminal of a comparator 24 through a resistor 24a.

A smoothed voltage $V_D$ appearing at a juncture 22c between the capacitor 22a and the resistor 22b is applied to a non-inverting input terminal of the comparator 24 through a resistor 24b.

Numeral 25 designates a switching circuit connected to an output terminal of the comparator 24 and comprising transistors 25a to 25d, resistors 25e to 25g and a diode 25h, wherein a collector-emitter path of the last-stage (power) transistor 25d is connected in series with the field coil 12 of the alternator for controlling a current flow of the field current flowing therethrough.

Numeral 26 designates a constant voltage circuit connected to the battery 3 through the key switch 5 and for supplying a constant voltage $V_Z$ to dividing resistors 28 and 29, so that a voltage appearing at a juncture between the resistors 28 and 29 is supplied to one of input terminals of the operational amplifier 21 as the reference voltage $V_O$ through a resistor 21b. The dividing resistors 30 and 31 are connected to the battery 3 and the battery feedback voltage $V_S$ is supplied to the other input terminal of the amplifier 21 through a resistor 21a.

Figure 2:
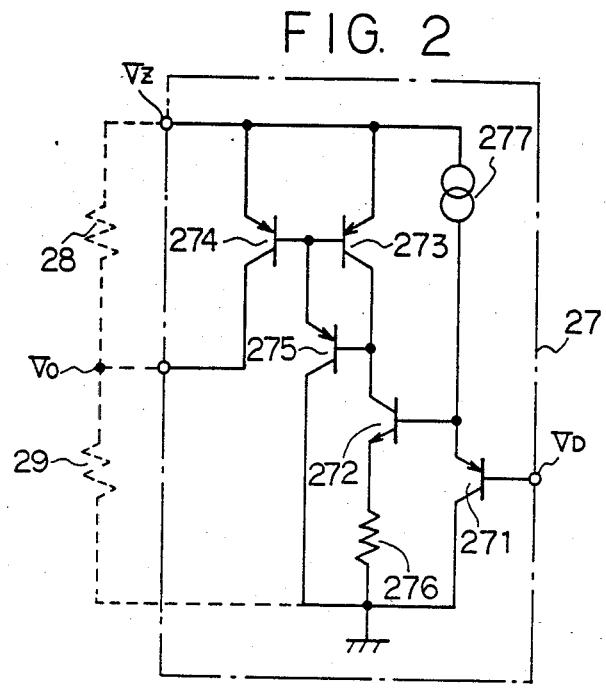
FIG. 2 is an electric wiring diagram showing a detailed construction of a reference voltage changing circuit 27 shown in FIG. 1.

Numeral 27 designates a reference voltage changing circuit for changing the reference voltage $V_O$ in response to a change of the smoothed voltage $V_D$, a detailed construction of which is shown in FIG. 2.

In FIG. 2, transistors 271 and 272 and a resistor 276 constitute an impedance converting circuit, a base of the transistor 271 is connected to the juncture 22c of the smoothing circuit 22 so that the smoothed voltage $V_D$ is applied thereto, and an emitter of the transistor 271 is connected to a constant current source 277. Transistors 273, 274 and 275 constitute a current mirror circuit, wherein emitters of the transistors 273 and 274 are connected to the constant voltage circuit 26, a collector of the transistor 273 as well as a base of the transistor 275 is connected to a collector of the transistor 272, and a collector of the transistor 274 is connected to the juncture of the dividing resistors 28 and 29.

When it is assumed that a resistance value of the resistor 276 is r, a current Ir represented by the following equation (1) flows through the resistor 276:

$$I_r = V_D/r \quad (1)$$

Since a current, substantially equal to the current $I_r$, flows through the transistor 273, a current $I_A$ represented by the following equation (2) flows through the transistor 274:

$$I_A = \alpha \cdot I_r = \alpha \cdot V_D/r \quad (2)$$

wherein $\alpha$ designates a constant.

Accordingly, the reference voltage $V_O$ modified by the circuit 27 is represented by the following equation (3):

$$V_O = \frac{r29}{r28 + r29} \cdot V_z + \alpha \cdot \frac{r28 \cdot r29}{r28 + r29} \cdot \frac{V_D}{r} \quad (3)$$

wherein r28 and r29 designate resistance values of the dividing resistors 28 and 29, respectively.

As understood from the above equation (3), the reference voltage $V_O$ is changed to become higher or lower in response to the increase or decrease of the smoothed voltage $V_D$.

An operation of the above-described embodiment will now be explained with reference to the attached drawings of FIGS. 3 to 5.

Figure 3:
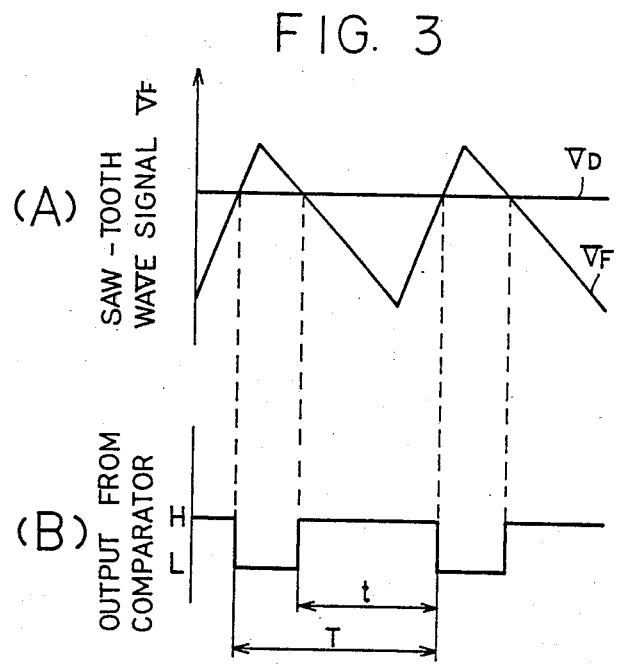
FIG. 3 is a waveform diagram for explaining an operation of the above embodiment.
Figure 4:
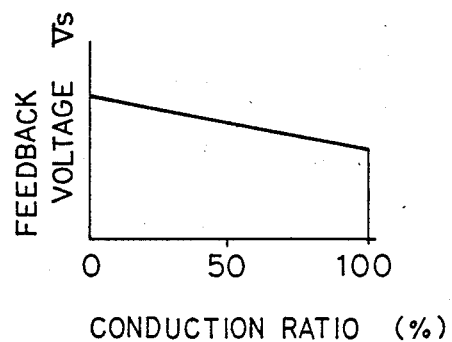
FIG. 4 is a graph showing a relationship between a feedback voltage and a conduction ratio when a reference voltage is constant.

The circuit 23 generates periodically a saw-tooth wave signal voltage $V_F$ as shown in (A) of FIG. 3, while the smoothed voltage $V_D$ from the operational amplifier 21 increases or decreases in response to a difference voltage of $V_O - V_S$. The above voltages $V_F$ and $V_D$ are compared at the comparator 24 and the comparator produces a high-level signal when the voltage $V_D$ is higher than the voltage $V_F$ and produces a low-level signal when $V_F$ is higher than $V_D$, as shown in (B) of FIG. 3. Since the power transistor 25d is made conductive during a time period t during which the comparator 24 produces the high-level signal, a conduction ratio of the power transistor 25d is represented by t/T, wherein T is one cycle of the saw-tooth wave signal. The conduction ratio is, therefore, increased as the smoothed voltage $V_D$ increases. In other words, the difference voltage of $V_O - V_S$ should become larger in order to increase the conduction ratio, which means that the conduction ratio is increased as a result of a decrease of the feedback voltage $V_S$ when the reference voltage $V_O$ is constant, as shown in FIG. 4. That is to say that when the electrical load 4 requires a larger amount of electric current, the conduction ratio is increased resulting in a decrease of the feedback voltage, namely the battery voltage.

Figure 5:
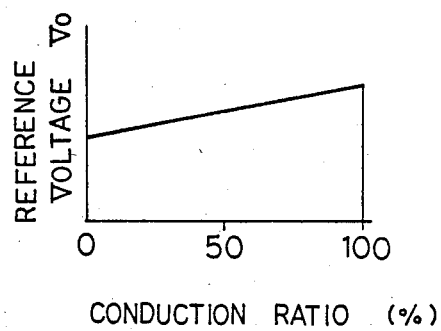
FIG. 5 is a graph showing a relationship between the reference voltage and the conduction ratio.

According to the present invention, however, since the reference voltage $V_O$ is changed to become higher or lower in response to the increase or decrease of the smoothed voltage $V_D$, as already explained above, the decrease of the battery voltage is prevented by selecting the constant $\alpha$ in the equation (3) in such a manner that the reference voltage $V_O$ is increased in response to the increase of the smoothed voltage $V_D$, that is the conduction ratio, as shown in FIG. 5.

As above, even when the conduction ratio is changed, the battery voltage can be maintained at a desired constant value. Although in the above-explained embodiment the conduction ratio of the power transistor is indirectly detected by detecting the output voltage of the operational amplifier, the conduction ratio can be directly detected as disclosed in a co-pending U.S. patent application of Ser. No. 638,648 filed on Aug. 7, 1984 (priority : Japanese application 58-144743) and assigned to the present assignee.

What is claimed is:

1. a battery voltage regulating system for an automotive vehicle having a battery, an alternator driven by an internal combustion engine mounted on said vehicle and generating an alternating current, and a full-wave rectifier for rectifying said alternating current to charge said battery, comprising:
   an operational amplifier connected to said battery for comparing a battery voltage with a reference voltage and for producing an output voltage which varies in response to a difference between said battery voltage and said reference voltage;
   a generating circuit for generating a saw-tooth wave signal voltage;

a comparing circuit connected to said operational amplifier and said generating circuit for comparing said saw-tooth wave signal voltage with said output voltage;

a switching circuit having a power transistor connected to a field coil of said alternator and connected to said comparing circuit for controlling a current flow of a field current flowing through said field coil in accordance with a comparison between said saw-tooth wave signal voltage and said output voltage; and a reference voltage changing circuit for detecting a conduction ratio of said power transistor and changing said reference voltage in response to the detected conduction ratio so as to prevent the battery voltage from decreasing when the conduction ratio increases.

2. A battery voltage regulating system as set forth in claim 1, further comprising:

a smoothing circuit having a resistor and a capacitor and connected to an output terminal of said operational amplifier for smoothing said output voltage, a juncture between said resistor and capacitor being connected to said comparing circuit.

3. A battery voltage regulating system as set forth in claim 2, wherein said reference voltage changing circuit is connected to said juncture for detecting said conduction ratio.

4. A battery voltage regulating system as set forth in claim 3, further comprising:

a constant voltage circuit connected to said battery and for supplying a constant voltage;

a pair of dividing resistors connected to said constant voltage circuit, a juncture between said dividing resistors being connected to said operational amplifier for applying a voltage appearing at said juncture to said amplifier as said reference voltage.

5. A battery voltage regulating system as set forth in claim 4, wherein said reference voltage changing circuit comprises:

a constant current source connected to said constant voltage circuit for supplying a constant current;

an impedance converting circuit having a first transistor connected at its base to said juncture of said smoothing circuit and its emitter to said constant current source, a second transistor connected at its base to said emitter of said first transistor, and a resistor connected to an emitter of said second transistor; and a current-mirror circuit having a third and a fourth transistors, each having an emitter connected to said constant voltage circuit and a base connected to each other, and a fifth transistor connected at its base to a collector of said second transistor and at its emitter to the bases of said third and fourth transistors, a collector of said third transistor being connected to said collector of said second transistor and a collector of said fourth transistor being connected to said juncture of said dividing resistors.

6. A battery voltage regulating system for an automotive vehicle having a battery, an alternator driven by an internal combustion engine mounted on said vehicle and generating an alternating current, and a full-wave rectifier for rectifying said alternating current to charge said battery, comprising:

first means connected to said battery for comparing a battery voltage with a reference voltage and for producing an output which varies in response to a difference between said battery voltage and said reference voltage;

second means for generating a saw-tooth wave signal;

third means for comparing said saw-tooth wave signal with said output;

fourth means connected to a field coil of said alternator for controlling a current flow of a field current flowing through said field coil in accordance with a comparison between said saw-tooth wave signal and said output; and fifth means for detecting a conduction ratio of said field current and changing said reference voltage in response to the detected conduction ratio so as to prevent the battery voltage from decreasing when the conduction ratio increases.

* * * * *